United States Patent
Hiramatsu et al.

(10) Patent No.: US 8,919,503 B2
(45) Date of Patent: Dec. 30, 2014

(54) BRAKE LINING FOR RAILROAD CAR

(75) Inventors: Shinichiro Hiramatsu, Osaka (JP); Takanori Kato, Hyogo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 51 days.

(21) Appl. No.: 13/491,903

(22) Filed: Jun. 8, 2012

(65) Prior Publication Data

US 2012/0298458 A1 Nov. 29, 2012

Related U.S. Application Data

(63) Continuation of application No. PCT/JP2010/073697, filed on Dec. 28, 2010.

(30) Foreign Application Priority Data

Dec. 28, 2009 (JP) .................. 2009-298256

(51) Int. Cl.
F16D 55/00 (2006.01)
F16D 65/092 (2006.01)
B61H 5/00 (2006.01)

(52) U.S. Cl.
CPC ............... *F16D 65/092* (2013.01); *B61H 5/00* (2013.01)
USPC ............. 188/73.31; 188/73.32; 188/250 G; 188/250 B; 188/250 E

(58) Field of Classification Search
USPC ......... 188/250 G, 250 B, 73.31, 73.32, 250 E
See application file for complete search history.

(56) References Cited

U.S. PATENT DOCUMENTS 2,943,713 A * 7/1960 Salak et al. ................ 188/251 R
3,198,294 A * 8/1965 Stacy ............................ 188/234
4,535,874 A * 8/1985 Pollinger et al. ............. 188/73.1
4,640,390 A * 2/1987 Saumweber et al. ...... 188/73.37
5,934,418 A * 8/1999 Wirth ........................... 188/73.1

(Continued)

FOREIGN PATENT DOCUMENTS

JP 59-212540 12/1984
JP 2008-151188 7/2008
JP 2008-223852 9/2008
JP 2009-041583 2/2009

OTHER PUBLICATIONS

Computer generated English translation of Japanese Patent Document 10-507250 published Jul. 14, 1998.

*Primary Examiner* — Thomas Irvin
*Assistant Examiner* — Mahbubur Rashid
(74) *Attorney, Agent, or Firm* — Clark & Brody

(57) ABSTRACT

A brake lining for a railroad car brake includes friction members which are pressed onto the sliding surface of a brake disc, and a back plate which is attached to a brake caliper in order to support the friction members. The friction members are dividedly arranged in a radial direction and in a circumferential direction of the brake disc. A disc spring is disposed between each respective friction member and the back plate. An outer peripheral surface of the friction members facing the back plate is formed in a convex curved shape in an area outside the elastic member. When a light pressing force is applied, a pressing force is transmitted from the back plate to the friction members via the disc springs. When a heavy pressing force is applied, the back plate and a rounded surface portion make contact, thereby directly transmitting a pressing force to the friction members.

4 Claims, 4 Drawing Sheets

(56) References Cited

U.S. PATENT DOCUMENTS

| | | | |
|---|---|---|---|
| 7,051,847 B2 * | 5/2006 | Wirth | 188/250 G |
| 2003/0234149 A1 * | 12/2003 | Peterseim et al. | 192/70.14 |
| 2006/0237270 A1 * | 10/2006 | Maehara | 188/250 R |

* cited by examiner (a)

(b)

BRAKE LINING FOR RAILROAD CAR

TECHNICAL FIELD

The present invention relates to a brake lining for a railroad car which effectively distributes thermal energy generated by friction against a brake disc, thereby making it possible to increase the durability of both the brake lining and the brake disc.

BACKGROUND ART

With the increased speed and greater size of land transportation machinery such as railroad cars and automobiles, as well as motor bicycles and the like, disc brakes have come to be widely used as braking devices for such vehicles.

Following is a description of an example of a disc brake used for a railroad car.

A disc braking system operates a brake caliper which presses a brake lining on a sliding surface of a brake disc mounted onto an axle or a wheel so as to produce a braking force and thereby control the speed of a vehicle by damping the rotation of the axle or the wheel.

When it works, the temperature of a contact surface of the brake lining and the brake disc rises due to a frictional heat, and with an increasing speed of the vehicle, the temperature of the contact surface rises due to an increased brake load.

In a conventional disc brake of the type shown in FIG. 6, a brake lining 1 has a structure such that a friction member 1a, which makes contact with a sliding surface 2a of a brake disc 2, is attached to a back plate 1b by means of a rivet (not pictured) or an adhesive or the like.

A pressing force which is applied as a load by the brake caliper onto the brake lining does not operate evenly on the entire brake lining, but rather, it concentrates on a specified area thereof, due to the structure of an attaching member. For example, in the case of a hydraulic caliper, a central position 3 of a pressing load is located on a compressing piston, as shown in FIG. 6. In the case of a lever caliper, a pressing load is applied at a location where a caliper arm and a lining holder interface with each other, in a similar manner as in the case of the hydraulic caliper.

As described above, the conventional disc brake has a structure such that the pressing force applied by the brake caliper operates only on a portion of the brake lining. As a consequence, the contact surface pressure between the brake lining and brake disc increases directly beneath the location where the pressing force operates, producing a local rise in temperature.

Accordingly, a uniform surface pressure lining is needed to mitigate the local rise in temperature. For example, Patent Reference 1 discloses a brake lining with a friction member 11 attached to a back plate 12, with an elastic member 13 disposed between them, and arranged so as to avoid a fastening hole 21, as shown in FIG. 7. Provision of such a structure equalizes the contact surface pressure between the brake lining and the brake disc, and inhibits the local temperature from rising.

However, the technology disclosed in Patent Reference 1 interposes an elastic member when attaching a the friction member to the back plate, so that when a pressing force operates, the friction member increases in temperature, and the elastic member yields, subsequently making it impossible for the elastic member to effectively achieve its inherent uniform surface pressure function.

In Patent References 2 and 3, technologies are disclosed for uniformly applying the pressing force from the brake caliper and inhibiting the local temperature from rising, by dividing the friction member into a plurality of parts with spherical-seated structure disposed between them.

However, in the technologies disclosed in Patent References 2 and 3, the uniform surface pressure function is lost if the components of the spherical-seated structure undergo plastic deformation due to the pressing force.

PRIOR ART REFERENCES

Patent References

Patent Reference 1: Japanese Patent Application Kokai Publication No. 2008-151188
Patent Reference 2: Japanese Patent Application Tokuhyo Publication No. 10-507250
Patent Reference 3: Japanese Patent Application Kokai Publication No. 2008-223852

SUMMARY OF THE INVENTION

Problem to be Solved by the Invention

The problem which the present invention aims to solve is that in the prior art technology, which inhibited an increase in a local temperature by uniformly applying a contact surface pressure between the brake lining and the brake disc, no consideration was given to protecting the structural component which performs the uniform surface pressure function.

Means for Solving this Problem

The brake lining for a railroad car according to the present invention is a brake lining for a railroad car which is pressed by a brake caliper against a sliding surface of a brake disc. In order to protect an elastic member which performs a uniform surface pressure function, the brake lining comprises: friction members which are pressed onto the sliding surface of the brake disc; and a back plate which is attached to the brake caliper and supports the friction members, wherein the friction members are distributed such that two or more thereof are arranged in each of a radial direction and a circumferential direction of the brake disc, an elastic member disposed between each respective friction member and the back plate, each respective friction member has an outer peripheral surface, located radially outside the elastic member, which is formed in a convex curved shape, and when a light pressing force is applied, a uniform surface pressure is achieved by transmitting a pressing force from the back plate to the friction members via the elastic members, and when a heavy pressing force is applied, the uniform surface pressure is maintained as much as possible by means of the convex curved shape portions making contact with the back plate, to directly transmit the pressing force to the friction members.

The brake lining for a railroad car according to the present invention has surfaces facing the back plate of friction members which are made convex curved and thereby maintains the uniform surface pressure as much as possible when heavy pressure is applied due to the fact that the convex curved surface makes contact with the back plate, while directly transmitting the pressing force to the friction members.

Therefore, the elastic members which bring about the uniform surface pressure can be prevented from yielding due to increasingly elevated temperatures when heavy pressing force is applied, thereby protecting the elastic members.

Advantageous Effects of the Invention

According to the present invention, the surfaces of the friction members are formed in a convex curved shape which faces the back plate so that when heavy pressing force is applied, the convex curved shape portions make contact with the back plate, and the pressing force is directly transmitted to the friction members, thereby making it possible to prevent deformation and deterioration of the elastic members which are disposed between the friction members and the back plate, and to achieve a uniform surface pressure.

It is possible to maintain the uniform surface pressure as much as possible, with the load being widely distributed by the convex curved shape portions, even when heavy pressing force is applied, because the friction members are formed in a convex curved shape which faces the back plate, with their outer peripheral surfaces disposed away from the elastic members.

PREFERRED EMBODIMENT

According to the present invention, the object of protecting the elastic members disposed between the friction members and the back plate, as well as the object of maintaining a uniform surface pressure, are achieved by forming the surface of the friction members in a convex curved shape facing the back plate, so that when a heavy pressing force is applied, the back plate makes contact with the convex curved shape portions positioned on the outer side of the elastic members, thereby directly transmitting the pressing force to the friction members.

EXAMPLES

The preferred embodiment of the present invention is described below, along with the process from conceptualizing the present invention to solving the problem of the prior art.

The present inventors considered the fact that when a heavy pressing force is applied, the temperature of a friction member rises, causing a yield of the elastic member disposed between the friction member and the back plate, and the present inventors realized that it would be effective to limit the use of the elastic member when a heavy pressing force is applied, in order to maintain the uniform surface pressure function of the elastic member over a long period of time.

The present inventors also determined that when a heavy pressing force is applied, a sufficient uniform surface pressure can be achieved by means of an elasticity of the friction member itself and by means of an elasticity of the lining device as a whole, even if the function of the elastic member is not employed.

The brake lining for a railroad car of the present invention was devised as a result of research based on the above concept.

The brake lining for a railroad car of the present invention is pressed by a brake caliper against, for example, sliding surfaces of brake discs mounted onto an axle or brake discs mounted onto a wheel by bolt connection.

Figure 1:
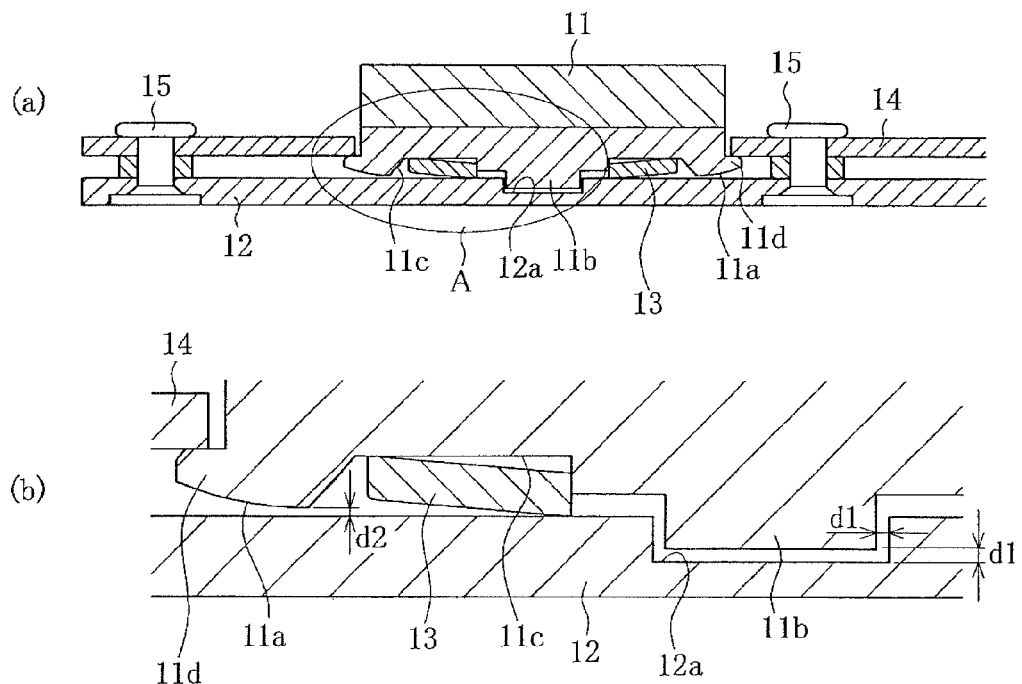
FIG. 1 (a) is a sectional view illustrating the essential features of a first example of the brake lining according to the present invention, and (b) is a partially enlarged view of the circled portion A in (a).

In FIG. 1, Reference Numeral 11 is a friction member which is pressed onto the sliding surface of a brake disc, and elastically supported by a back plate 12 which is attached to the brake caliper, and intermediated by a disc spring 13, for example. During maximum service braking, the spring constant of the disc spring 13 is set such that it flexes to an extent substantially equal to a gap between the back plate 12 and a later-described rounded surface portion 11a of the friction member 11.

Figure 2:
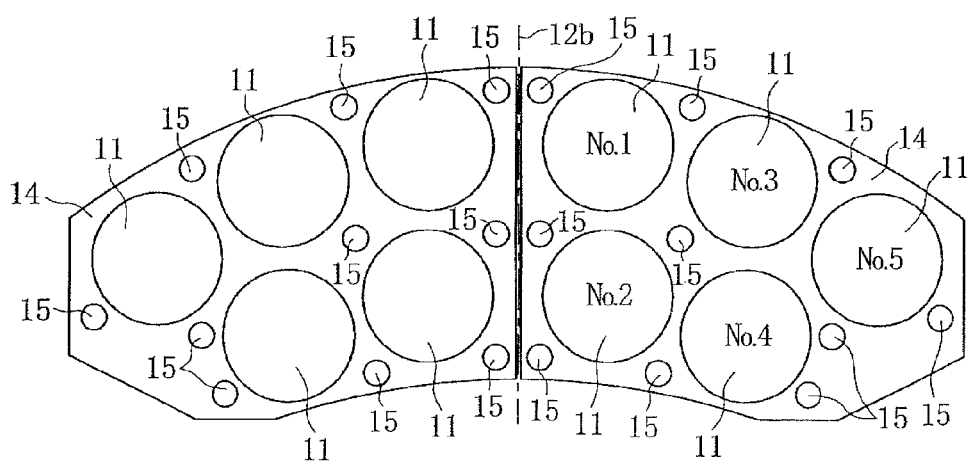
FIG. 2 is a planar view illustrating the first example of the brake lining according to the present invention.

The friction members 11 are divided into two members in the radial direction of the brake disc, as illustrated in FIG. 2, for example. The friction members 11 are divided into six members on the outer side in the circumference direction, and into 4 members on the inner side in the circumference direction, for a total of ten friction members, and they are symmetrically arranged in the circumference direction of the back plate 12 with respect to a central line 12b.

According to the present invention, the surfaces of the friction members 11 which face the back plate 12 are formed in a rounded shape, for example, and their centers are caused to protrude toward the back plate 12, and the peripheries of their centers are provided with concave spaces 11c which accommodate plate springs 13. It should be noted that in FIG. 1, Reference Numeral 11a is a rounded surface portion formed in the above-mentioned rounded shape, and Reference Numeral 11b is a protrusion which projects toward the back plate 12.

On the other hand, the back plate 12, which faces the protrusion 11b of the friction member 11, is provided with a recessed portion 12a into which the protrusion 11b is inserted in such a manner that there is a predetermined gap distance d1 along the outer periphery of the protrusion 11b and along the height at which it projects.

The gap distance d1 should be greater than a gap distance d2 between the rounded surface portion 11a and the back plate 12.

Due to the fact that the above-described structure is employed, in a case where the friction members 11 move in parallel horizontally with respect to the back plate 12, the protrusion 11b restricts this movement because the protrusion 11b abuts the recessed portion 12a, thereby transmitting force to the back plate 12. On the other hand, in a case where the plate springs 13 contract until the rounded surface portion 11a of the friction members 11 abut the back plate 12, no further load operates on the disc springs 13 after this abutment occurs.

In the example shown in FIG. 1, the friction member 11 is attached to the back plate 12 in such a manner that the presser bar 14 is drawn toward the back plate 12, to slightly press the disc spring 13 by a rivet 15 which passes through the back plate 12 and through the presser bar 14 with which a rim 11d provided to the friction member 11 is held.

In the brake lining for a railroad car according to the present invention having the above-described structure, when a light pressing force, which frequently occurs, is applied, a uniform surface pressure is achieved due to the fact that a pressing force is transmitted from the back plate 12 via the disc spring 13 to the friction member 11.

When a heavy pressing force, which is only rarely used, is applied, the back plate 12 and the rounded surface portion 11a come into contact after the disc spring 13 is pressed to a predetermined dimension, and a uniform surface pressure is maintained as much as possible by the rounded surface portion 11a, while the pressing force is directly transmitted to the friction member 11. Consequently, the disc spring 13 does not undergo permanent deformation even in a high-temperature and high-pressure environment due to heavy pressing force, so its function is continuously maintained. In addition, due to the fact that the rounded surface portion 11a is provided on the outer peripheral surface (outer circumference side) from the disc spring 13, the load is widely distributed to the outer periphery and more uniform pressure is achieved than in cases where the rounded surface portion 11a is provided on the inner side (the center side) from the disc spring 13.

Figure 3:
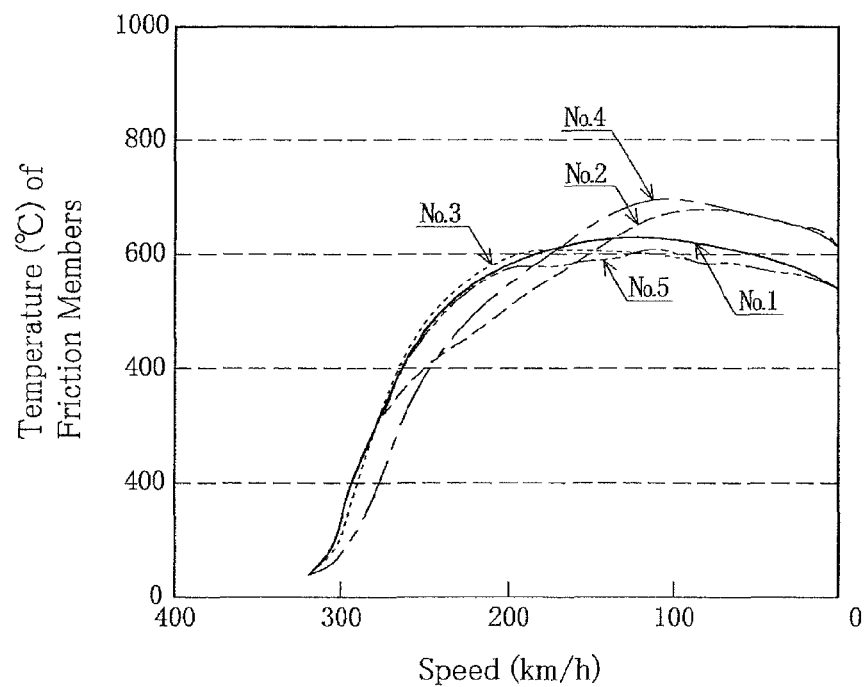
FIG. 3 is a graph showing the temperature of the friction members of the present invention when a light pressing force is applied.

FIG. 3 shows the temperature of various friction members in the brake lining of the present invention illustrated in FIG. 1, during braking tests in which there is a pressing force (5-10 kN) of a magnitude such that the friction members (made of a sintered alloy with outer diameter 60 mm and thickness 15 mm) do not come into contact with the back plate (steel with thickness 4.5 mm).

Figure 4:
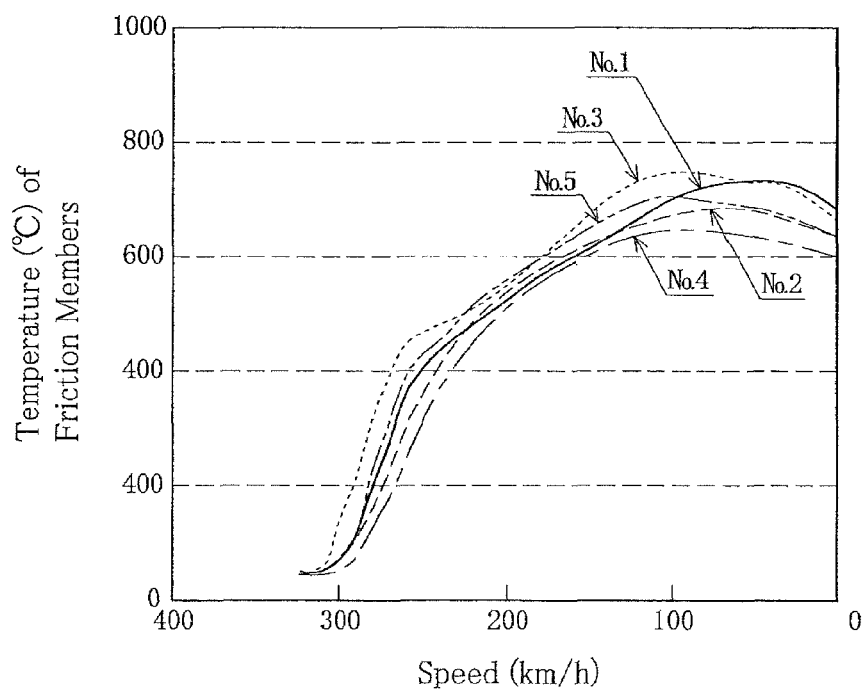
FIG. 4 is a graph showing the temperature of the friction members of the present invention when a heavy pressing force is applied.

FIG. 4 shows the temperature of various friction members during braking tests in which there is a pressing force (12-22 kN) such that the friction members come in contact with the back plate. It should be noted that No. 1 to No. 5 in FIG. 3 and FIG. 4 correspond to the friction members shown in FIG. 2.

In each case, there is little variation in the temperatures of the various friction members, which demonstrates that the advantageous effect of uniform surface pressure is achieved by the present invention.

The brake discs used in FIG. 3 and FIG. 4 are made of forged steel, with inner diameter 425 mm and outer diameter 715 mm, and the sliding surface which makes contact with the brake lining has an inner diameter of 428 mm and an outer diameter of 702 mm.

The present invention is not limited to the above-described example, and the preferred embodiment may, of course, be advantageously modified within the scope of the technical ideas recited in the claims.

Figure 5:
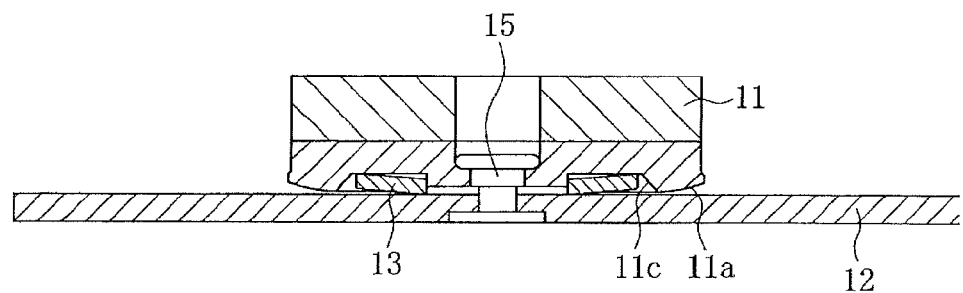
FIG. 5 is a sectional view illustrating the essential features of a second example of the brake lining according to the present invention.
Figure 6:
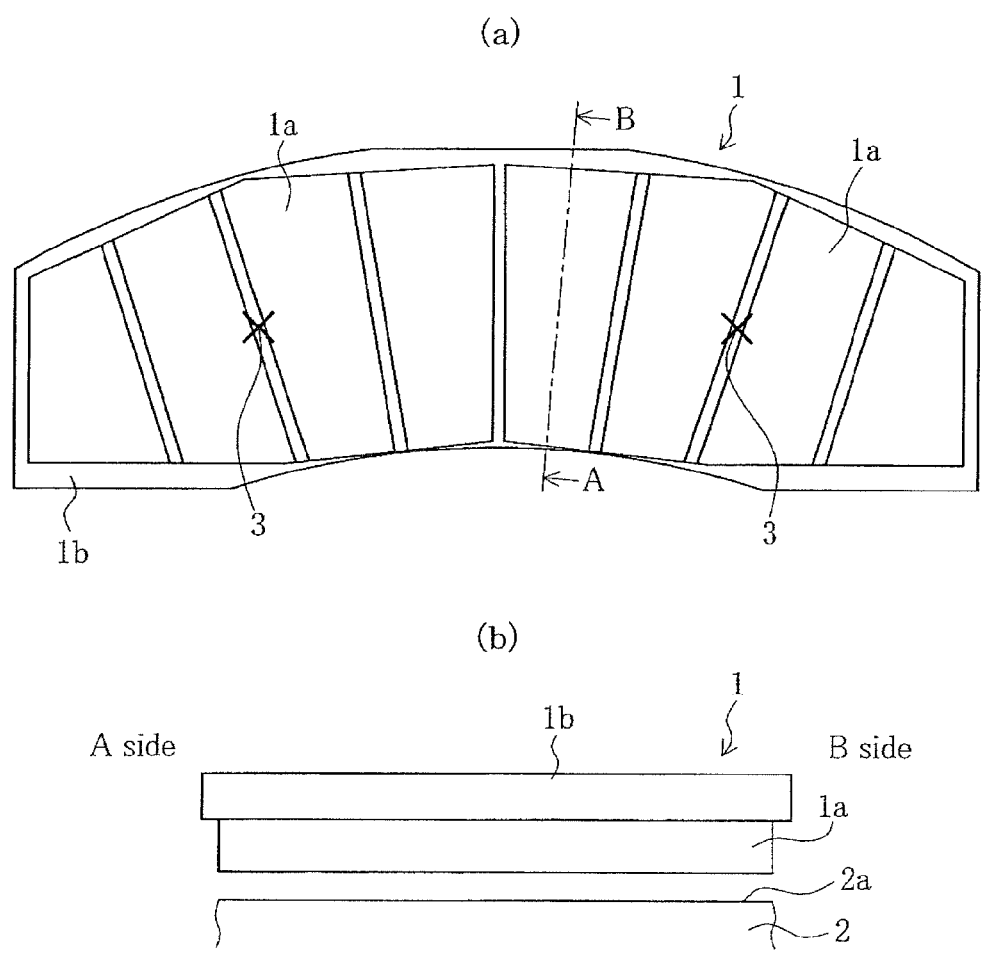
FIG. 6 is a drawing illustrating a brake lining and a brake disc forming a conventional disc brake for railroad cars, and (a) is a planar view of a brake lining as seen from the friction member side, and (b) is a sectional view along the line A-B in (a).
Figure 7:
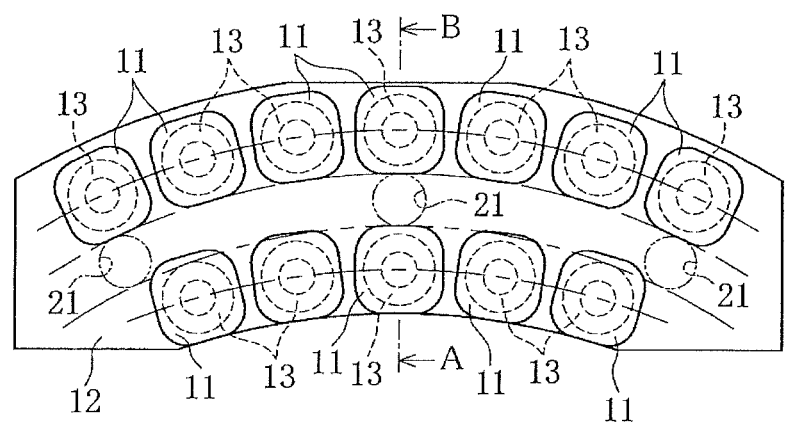
FIG. 7 is a drawing illustrating a brake lining forming a conventional disc brake for railroad cars, and (a) is a planar view of a brake lining as seen from the friction member side, and (b) is a sectional view along the line A-B in (a).
Figure 7:
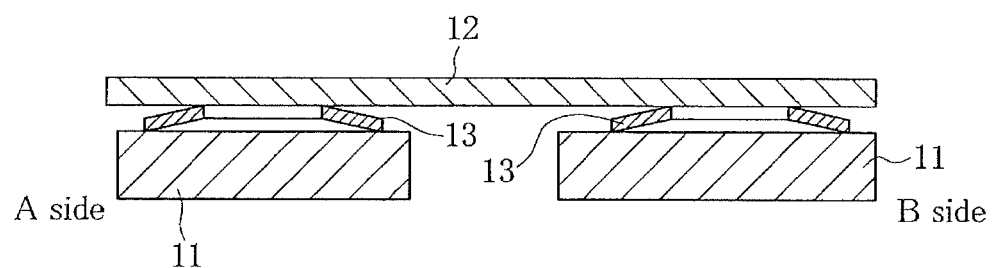

For example, attachment of the friction member 11 to the back plate 12 is not limited to the configuration illustrated in FIG. 1, but it may also be configured as shown in FIG. 5, so that a rivet 15 passes through the center portion of the friction member 11 and a through hole provided to the back plate 12 facing this center portion.

Furthermore, the elastic member disposed between the friction member 11 and the back plate 12 may employ a coil spring instead of the disc spring 13.

Moreover, the shape of the surface of the friction member 11 which faces the back plate 12 is not limited to a rounded surface shape, as long as it is shaped in a convex curve, and as long as it is able to maintain a uniform surface pressure as much as possible, while directly transmitting a pressing force to the friction member 11.

INDUSTRIAL APPLICABILITY

The present invention described above is not limited to use in brake discs for railroad cars, but it can also be used in brake discs for automobiles as well as motor bicycles and the like.

EXPLANATION OF THE REFERENCE SYMBOLS

11 Friction member
11a Rounded surface portion
11b Protrusion
11d Rim
12 Back plate
12a Recessed portion
13 Disc spring
14 Presser bar
15 Rivet
21 Fastening hole

The invention claimed is:

1. A brake lining for a railroad car is pressed by a brake caliper against a sliding surface of a brake disc, comprising:
a plurality of friction members which are pressed onto the sliding surface of the brake disc;
a back plate which is attached to the brake caliper and supports the plurality of friction members, wherein the plurality of friction members are distributed so that plural friction members are arranged in each of a radial direction and a circumferential direction of the back plate, and
an elastic member is disposed between each respective friction member and the back plate, each respective friction member has an outer peripheral surface, located radially outside the elastic member, an entirety of the outer peripheral surface being formed in a convex curved shape, so that when a light pressing force is applied, a uniform surface pressure is achieved by transmitting a pressing force from the back plate to the friction members via the elastic members, and when a heavy pressing force is applied, the uniform surface pressure is maintained by means of the convex curved outer peripheral surfaces making contact with the back plate but not via the elastic members, to directly transmit the pressing force to the friction members.

2. A brake lining for a railroad car according to claim 1, wherein the friction members are attached to the back plate so as to draw toward the back plate a presser bar which engages with a rim which is provided to the friction member.

3. A brake lining for a railroad car according to claim 2, wherein a protrusion is provided at a center of the friction member on a side of the convex curved surface, and the back plate, which faces the protrusion, is provided with a recessed portion, the recessed portion being larger than a gap between a spherical surface portion of the friction member and the black plate, into which the protrusion is inserted in such a manner that the gap has a predetermined gap distance along an outer periphery of the protrusion and along a height at which it projects.

4. A brake lining for a railroad car according to claim 1, wherein the friction members are attached to the back plate by means of a connecting member which passes through the center portion of the friction member and a through hole provided to the back plate facing this center portion.

* * * * *